United States Patent [19]

Fields

[11] Patent Number: 4,679,635
[45] Date of Patent: Jul. 14, 1987

[54] SELF-TRIPPING RIPPERS

[76] Inventor: Eddie L. Fields, 26979 Dawson Rd., Monroe, Oreg. 97456

[21] Appl. No.: 790,665

[22] Filed: Oct. 28, 1985

[51] Int. Cl.$^4$ .......................... A01B 13/08; E02F 5/32
[52] U.S. Cl. ................................. 172/260.5; 172/700; 172/502; 172/739
[58] Field of Search ............... 172/453, 462, 482, 488, 172/502, 699, 260.5, 497, 500, 657, 776, 739, 740, 705, 763, 710, 700, 691, 694, 697, 264, 271

[56] References Cited

U.S. PATENT DOCUMENTS

| D. 244,751 | 6/1977 | Watts | 172/260.5 |
|---|---|---|---|
| D. 244,752 | 6/1977 | Watts | 172/260.5 |
| 1,681,423 | 8/1928 | Monsarrat | 172/739 |
| 2,826,131 | 3/1958 | Willet | 172/699 |
| 3,120,281 | 2/1964 | Peveler | 172/739 X |
| 3,171,500 | 3/1965 | Dils | 172/700 |
| 3,207,232 | 9/1965 | Bechman | 172/699 X |
| 3,420,273 | 1/1969 | Greer | 172/265 |
| 3,606,928 | 9/1971 | Quanbeck | 172/705 |
| 4,079,789 | 3/1978 | Byrd | 172/740 |

FOREIGN PATENT DOCUMENTS 84882   6/1956   Denmark .................. 172/705

OTHER PUBLICATIONS

V-Shaped Parabolic Subsoiler, advertizing brochure of Beit Hashitta Israel, 1/1981.

Primary Examiner—Richard J. Johnson
Attorney, Agent, or Firm—Klarquist, Sparkman, Campbell, Leigh & Whinston

[57] ABSTRACT

A ground ripping attachment for pivotal connection to the drawbar of a winch, and liftable by cable on a towing vehicle to clear the ground, or releasable so as to be free of the tractor save for its drawbar connection. The attachment has a main frame which at its forward portion is pivotally connected to the drawbar, and has ground ripping means rearwardly of such pivotal connection. The ground ripping means is carried by one or more subframes which are pivotally mounted on the main frame for pivotal movement about horizontal axes. An accumulator urges the subframes to remain in their operative positions. The main frame has a stop for each subframe against which the subframe is caused to engage by the accumulator so that the individual subframes can individually automatically trip upon engaging immovable objects. Means are provided for fore and aft adjusting movement of the stop to vary the angle of attack of each ground ripping means.

The relative spacing of the ground ripping means rearwardly of the horizontal pivot axis, and the vertical distance of the soil ripping means from a plane containing a horizontal axis, is important.

The invention also includes an apparatus comprising a towing vehicle or crawler tractor in towing relation to an attachment as above described.

2 Claims, 4 Drawing Figures

SELF-TRIPPING RIPPERS

BACKGROUND OF THE INVENTION

This invention relates to soil rippers and particularly to tractor-drawn soil rippers.

Among the prior soil rippers of which I am aware are those which have a ripping attachment pivoted to the rear of a crawler tractor, with hydraulic or pneumatic means for applying a downward force to the tilling elements in an effort to determine their position beneath the soil.

A disadvantage of this arrangement is that the soil is tilled to varying depths as the crawler tractor undulates across a plot of ground.

It is a primary object of the present invention to provide a soil tiller, particularly for compacted soils and ideally, though not limited, to compacted forest soils, which is attachable to a pulling mechanism such as a crawler tractor and is so constructed that it can be elevated and lowered using the winch line from the tractor, and when lowered, will automatically seek a desired depth in the soil without requiring downward pressure such as by hydraulic or pneumatic means.

A further object of the invention is to provide such an attachment in which the tilling depth can be varied at the will of the user in a simple and effective manner.

Another object is to provide a structure as above recited in which the attachment includes a multiplicity of tiller members, independent supported, wherein the tiller members are self-tripping so that should one encounter an imovable object, it will simply trip out of the way and automatically reassume its tilling depth.

I have discovered that a tilling attachment carrying out the above objects can be produced wherein the attachment, because of its construction, seeks its own depth merely by having a pivoted but otherwise unconnected relationship to the crawler tractor. In order to accomplish this objective, I have determined that the tilling device must have certain dimensions, namely, one in which the distance from the pivot of the hitch to the ground is substantially less than the rearward location of the tilling elements from the pivot and in which the tilling elements are located at a substantially greater distance below the horizontal pull line than the distance from the hitch point to the ground.

I have also discovered that I can vary the tilling depth by incorporating a unique adjusting arrangement.

Various other objects of the invention will be apparent from the following description taken in connection with the accompanying drawings, wherein.

In the following description, the terms "tilling" and "ripping" and variations of both will be deemed equivalent.

Figure 1:
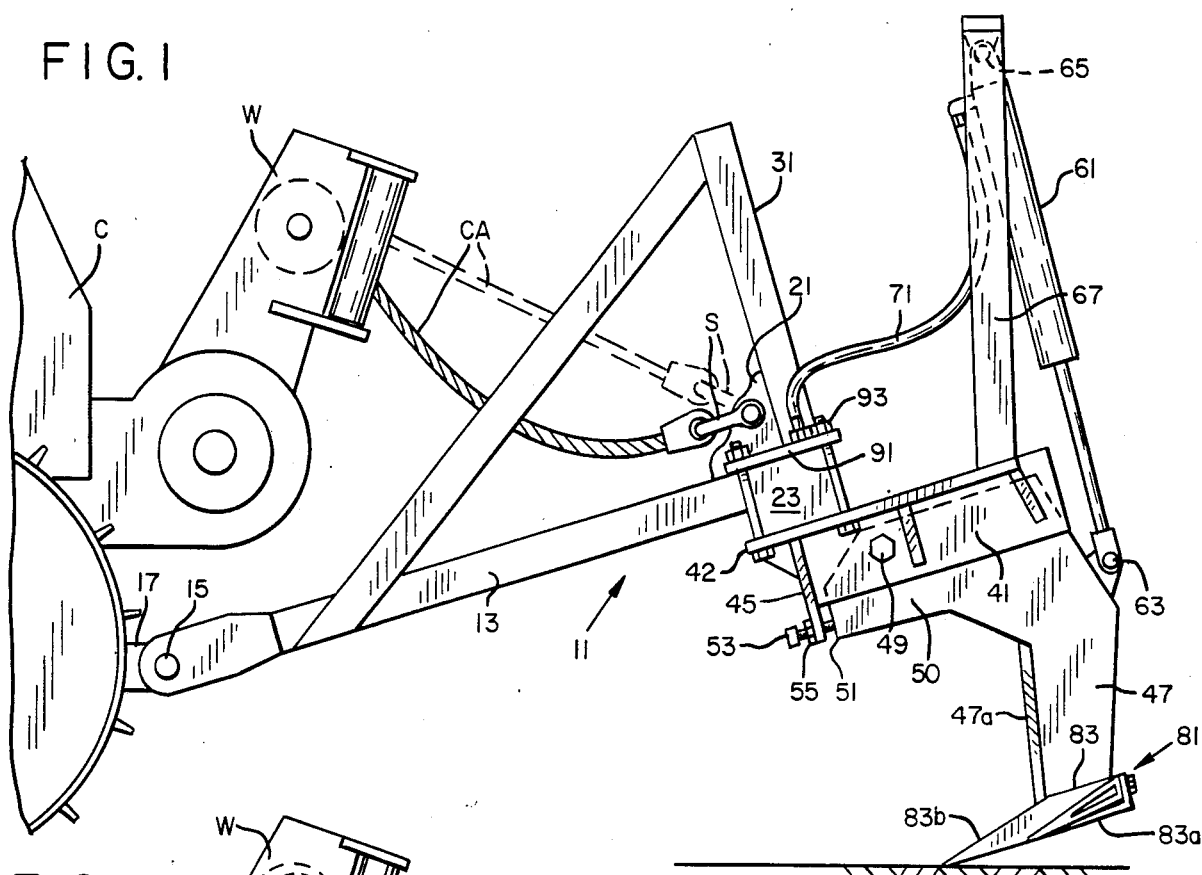
FIG. 1 is a side elevation of the ripping device of the present invention, showing the same as being towed by a crawler tractor, with the tilling flytes being lowered into engagement with the ground, but not yet having been pulled forwardly by the towing vehicle.

Referring to FIG. 1, a tilling device 11 of the present invention is shown as having a pair of two bars 13 (FIGS. 1 and 3) pivotally connected by pins 15 to the drawbar 17 of a crawler tractor C of conventional form. In the particular embodiment of the invention shown, it is assumed that the crawler tractor is equipped with a winch W (commonly used in logging operations) of conventional form having a cable CA shackled at S to a bracket 21 on the frame of the device.

In the particular embodiment of the invention disclosed the tilling device has a composite frame made up of a number of elements welded together, although, of course, the frame could take other forms. The tongues 13 are welded at their rear ends to a crosswise tank 23, which in the particular embodiment of the invention disclosed, comprises part of the frame. The frame further includes an angular reinforcing member 31 for each tongue, the member 31 being welded at its lower ends respectively to the associated tongue 13 and to the tank 23.

Figure 3:
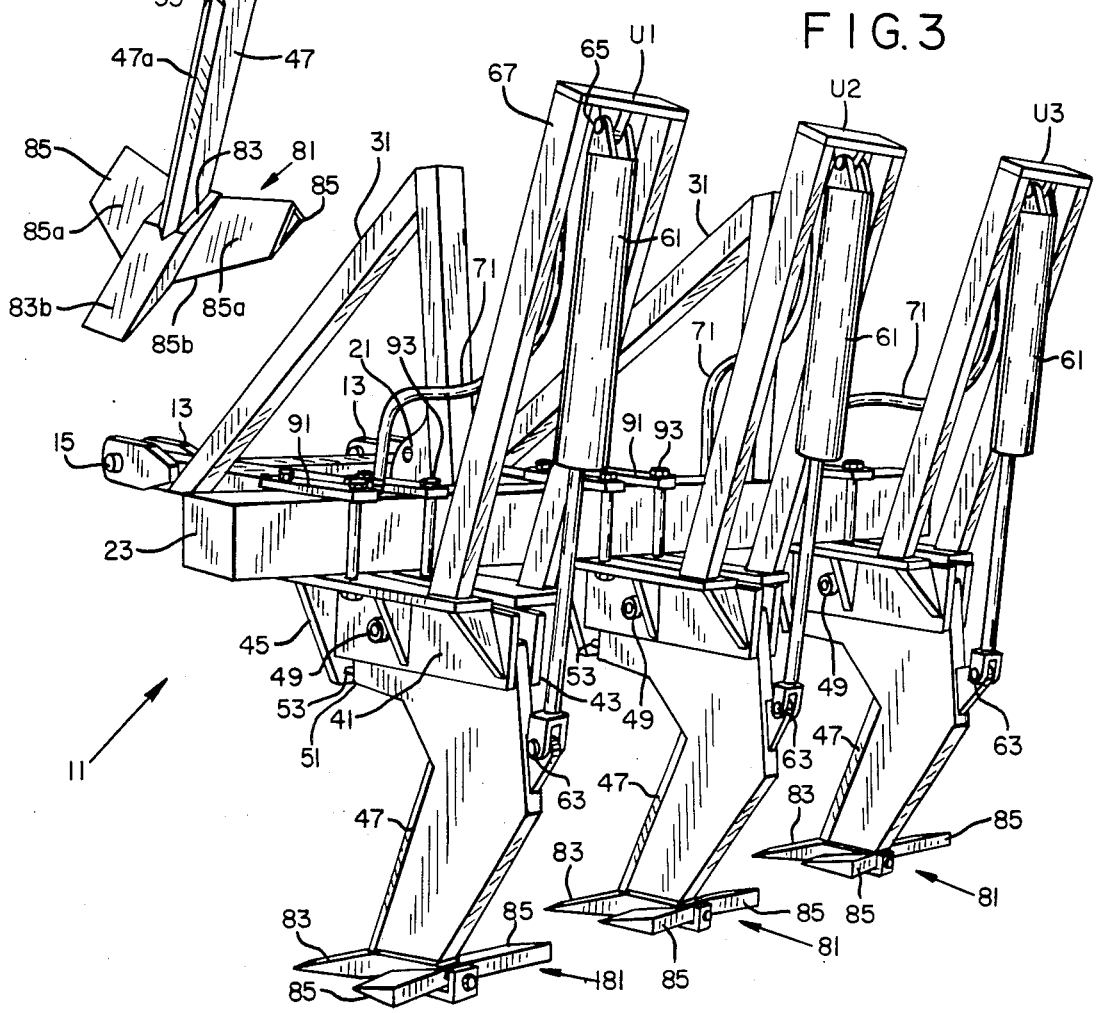
FIG. 3 is a perspective view of the tilling device separated from the towing vehicle, the view being taken generally from the rear of the device.

Mounted on the tank 23 are a plurality of ripping or tilling units labeled U1, U2 and U3 in FIG. 3. Each unit is of similar construction and with reference to unit U1, the same comprises a pair of side members 41 and 43 welded at their forward ends to a crossplate 45. These three members comprise a tilling unit frame detachably mounted on the attachment frame in a manner to be described.

The side members 41 and 43 are disposed in spaced relation to provide a gap to receive the upper end portion of a leg 47 which is pivoted at 49 to the side members 41 and 43. The leg has a forward cutting edge 47a.

Figure 2:
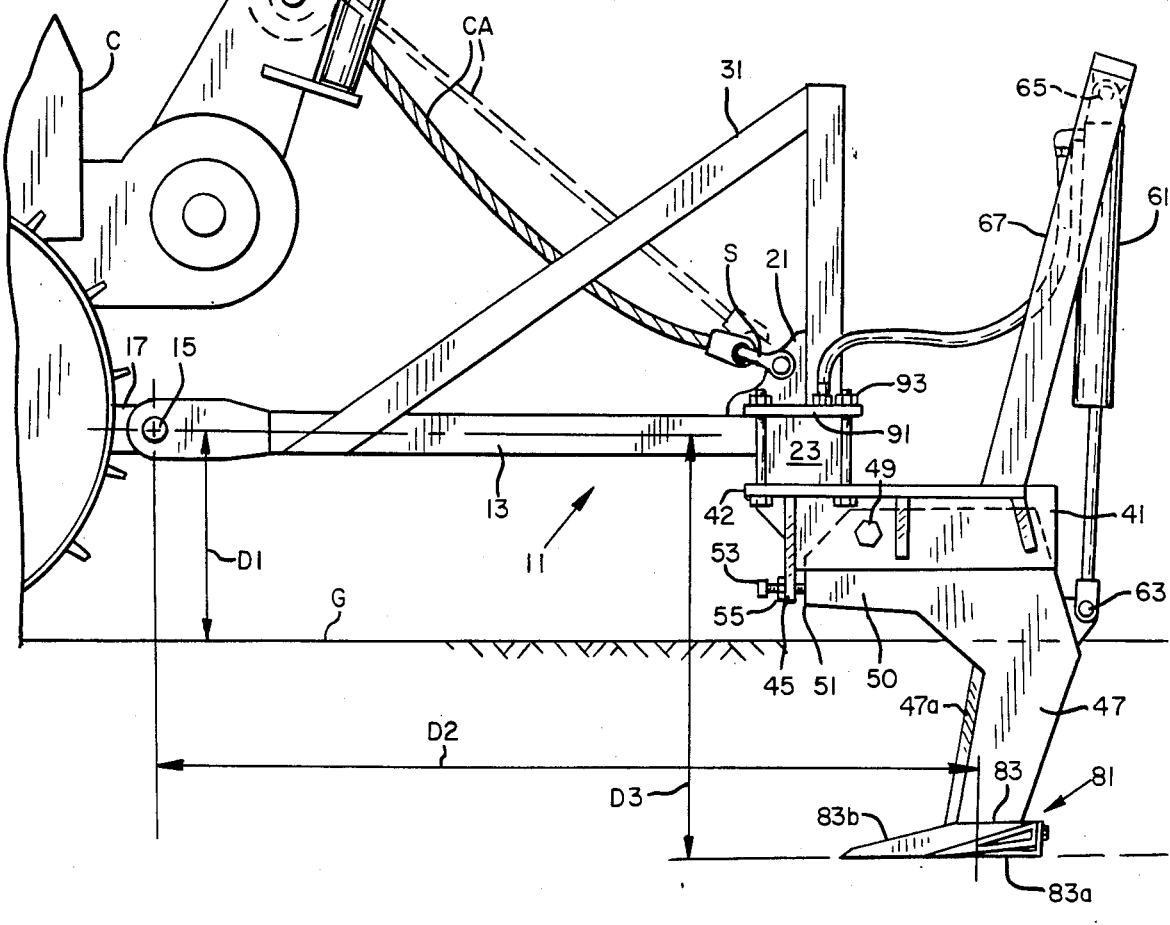
FIG. 2 is a view like FIG. 1 but showing the flytes as having moved themselves into the ground, assuming a predetermined tilling depth.

As best shown in FIGS. 1 and 2, the forwardly projecting leg has an upper portion 50 terminating in an edge 51 which at its lower portion engages the rear end of a setscrew 53 which threads through the crossplate 45 and is releasably retained in any position of adjustment by a lock nut 55. By loosening the lock nut, the extent of rearward projection of the setscrew can be varied for purposes to be described hereinafter.

The leg, because of the relative disposition of the pivot at 49 and the setscrew 53 and the configuration of the leg, will normally tend to rest against the setscrew. To releasably press the leg against the setscrew, I provide a piston and cylinder unit 61 (FIGS. 2 and 3) pivoted at 63 to the upper rear portion of the leg 47 and pivoted at 65 at its upper end to an inverted U-shaped mounting bracket 67. The latter has its lower ends welded or otherwise joined to the upper faces of the side members 41 and 43. A pressure line 71 extends from the upper end of the piston and cylinder unit and is connected at its opposite end to the accumulator 23.

It is evident therefore that the piston and cylinder unit urge the tilling arm 47 to remain in contact with the associated setscrew.

On the lower end of each tilling leg is a tilling or ripping flyte 81 (FIGS. 2 and 4) having a central portion 83 which has a relatively flat bottom surface 83a and an inclined upper surface 83b. The flyte has a pair of wing portions 85 flanking the central portion and having upper faces 85a. These incline vertically forwardly and downwardly to front edges 85b. The latter, viewed in plan, angle rearwardly. These inclined portions cause upward heaving of the compacted soil ripped by the flyte.

Each unit is detachably mounted on the tank 23 by two sets of bars 91 and bolts 93, the bolts passing through the upper flanges on the side members 41 and 43 and through the bars, with suitable nuts being tightened to clamp the unit at the desired place along the tank 23. In the arrangement shown in FIG. 3, there are three units, unit U2 being centrally disposed, with units U1 and U3 being arranged in flanking disposition. More or less units may be used if desired.

OPERATION

In operation, it may be assumed that the cable CA has been reeled in to lift the tilling device out of contact with the soil. This allows the tractor to move from place to place without interference because of contact of the flytes with the soil. When the desired spot has been reached, the cable is paid out to allow the flytes of the tilling units to contact the soil as shown in FIG. 1.

As the tractor tows the tilling device forwardly, the flytes automatically enter the soil because of the inclination of the flytes relative to the soil. It is pointed out that the piston and cylinder units 61 are incapable of applying any downward pressure on the tilling units, because they are capable only of forcing the tilling legs against the setscrews 53 and have nothing to do with the support of the tilling units from the tractor.

As the tractor pulls the tilling device forward and the flytes enter the soil, soon the flytes will assume the FIG. 2 position where their bottom surfaces are essentially horizontal. Because of unique dimensional relationship of the parts, the flytes will maintain the digging depth shown in FIG. 2 relatively independently of movement of the tractor across undulating soil.

However, not any tilling device mounted as shown in FIG. 2 would function as just described. I have discovered that the dimensional relationship of the parts must be of a certain character in order to achieve the desired results.

For instance, I have discovered that the height D1 (FIG. 2) of the drawbar from the surface of the ground or soil G must be distinctly less than the dimension D2 between the pivot pins 15 and the location of the flytes 81. Also, the relationship of the parts must be such that the dimension D3 must be greater than D1, but substantially less than D2. A relationship that works quite well is one where if the dimension D1 is two feet, then the dimension D2 would be approximately eight feet, whereas dimension D3 would be four feet. This 2/8/4 relationship is not an exact relationship but an approximate one. Nevertheless, it is crucial that the dimension D1 be only a minor fraction of the distance D2 and that the distance D3 would be substantially less than D2, but substantially more than D1.

Suppose that it is desired to dig at a lower level than that shown in FIG. 2. With the parts in the position shown in FIG. 1, the setscrews can be manipulated to extend their projection rearwardly so as to tilt the flytes 81 still more than they are tilted in FIG. 1. The flytes therefore, upon entering the soil, will move down to a lower depth until they substantially assume the positions in FIG. 2. If on the other hand, it is desired to rip at a shallower depth, the setscrews can be adjusted so that they project a lesser distance. Under the circumstances, the flytes will level off at a higher level than shown in FIG. 2.

It is pointed out that during a tilling or ripping operation, should one of the flytes encounter an immovable obstacle such as a boulder, its unit, say unit U1, will automatically trip rearwardly against the pressure of the accumulator 23 to a position where it can clear the boulder, after which it will automatically assume its proper digging depth without any pressure being applied to it for that purpose. Of course, the associated piston and cylinder unit 61 (pressured by the accumulator) will exert a clockwise pressure on the affected leg 47 of the unit, to urge it back against its associated setscrew, but after that is accomplished, the return of the tilling or ripping flytes to the desired level is automatic.

Figure 4:
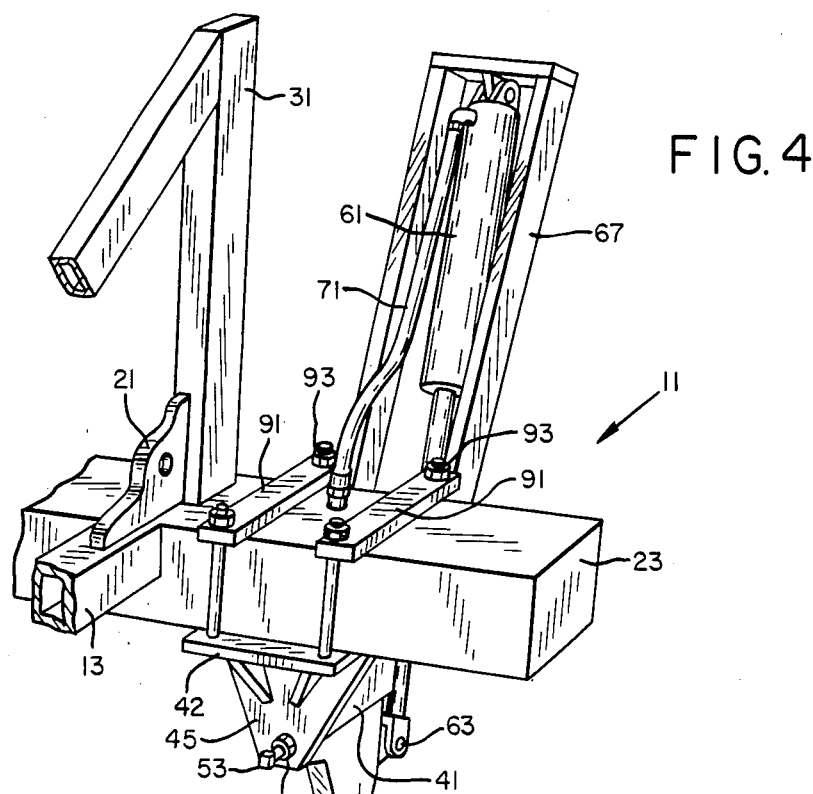
FIG. 4 is a fragmentary front perspective view of the device.

While bracket 21 is shown in FIG. 4 as being secured to the upright portion of the angular reinforcing member 31, the bracket could be centrally located on the tank 23.

FIG. 4 shows a flange 42 which is welded to the front face of the crossplate 45 and thus effectively forms forward extensions of the upper plates of the side members 41 and 43.

An important feature of the invention is the fact that the width of the ripping operation can be readily varied by loosening the bolts 93 and laterally repositioning the attachments on the mounting structure, which comprises the tank 23. Thus, looking at FIG. 3, it is evident that the two flanking units can be shifted inwardly or outwardly along the mounting tank structure 23. Obviously the tank structure could be made longer to accommodate more units than shown, to enable the desired ripping operation to be carried out in accordance with a desired pattern.

What is claimed is:

1. Apparatus comprising a crawler tractor equipped at its rear with a winch operated cable,
   said crawler tractor having a rearwardly extending drawbar,
   a ground ripping attachment comprising a main frame having a forward portion pivotally connected to said drawbar for pivotal movement about a horizontal axis,
   said attachment having ground engaging ripping means disposed rearwardly of said axis,
   cable attaching means on said main frame spaced rearwardly of said axis to facilitate connection of said cable and elevation of said attachment where said ripping means is clear of the ground to provide for travel of the tractor from one place to the other,
   said cable when unwound sufficiently completely releasing said attachment to facilitate unrestrained contact of said ripping means with the ground,
   and means independent of said cable and said tractor for varying the depth at which said ripping means rips the ground,
   wherein the horizontal spacing of said ripping means rearwardly of said axis is a multiple of the vertical distance from said tractor drawbar from the ground surface,
   and wherein the vertical spacing of the bottom portions of said rippng means from a horizontal plane containing said axis, in the ripping position of said ground ripping means, is substantially greater than said vertical distance, but substantially less than said horizontal spacing,
   said ripping means comprising a series of laterally related ground ripping members, each being pivotally mounted on the main frame for pivotal movement about a horizontal axis upwardly and rearwardly from a down operative position for automatic tripping upon engagement with an immovable object,
   accumulator means for releasably biasing said ground ripping members to remain in their operative positions, the sole ripping means for said attachment comprising a flyte on the lower end of each ground ripping member, each said flyte having a central portion having a relatively flat bottom surface and an inclined upper surface, each said flyte having a pair of wing portions flanking the central portion and having upper faces inclined forwardly and downwardly to define front edges which in plan angle rearwardly, said flytes together with the above recited spatial relationship enabling said ground ripping means to seek its own depth of penetration in the soil while being freely released from said cable.

2. A ground ripping attachment to be pulled by a crawler tractor or like vehicle equipped with a rearwardly extending drawbar and also equipped with a rear winch-operated cable or other lifting mechanism, said ground ripping attachment comprising a main frame, means on a forward portion of said main frame for pivotally connecting it to the drawbar of a towing vehicle, said attachment having ground ripping means disposed rearwardly of said pivot means, attaching means located rearwardly of said pivot means to facilitate connection of a lifting mechanism to said attachment and elevation of said attachment to a position where said ground ripping means is disposed clear of the ground to facilitate free travel of the towing vehicle from one place to another, the lifting mechanism being capable of completely releasing said attachment for contact with the ground, wherein the horizontal spacing of said ground ripping means rearwardly of said pivot means is a multiple of the vertical distance from said pivot means from the ground surface, and wherein the vertical spacing of said ground ripping means from a horizontal plane containing the pivotal axis of said pivot means, in the ripping position of said ground ripping means, being substantially greater than said vertical distance, but substantially less than said horizontal spacing, said ground ripping means comprising a series of laterally related ground ripping members, each being pivotally mounted on the main frame for pivotal movement about a horizontal axis upwardly and rearwardly from a down operative position for automatic tripping upon engagement with an immovable object, accumulator means for releasably biasing said ground ripping members to remain in their operative positions, the sole ripping means for said attachment comprising a flyte on the lower end of each ground ripping member, each said flyte having a central portion having a relatively flat bottom surface and an inclined upper surface, each said flyte having a pair of wing portions flanking the central portion and having upper faces inclined fowardly and downwardly to define front edges which in plan angle rearwardly, said flytes together with the above recited spatial relationship enabling said ground ripping means to seek its own depth of penetration in the soil while being freely released from said cable.

* * * * *